United States Patent
Jang et al.

(10) Patent No.: US 8,691,406 B2
(45) Date of Patent: Apr. 8, 2014

(54) SECONDARY BATTERY AND METHOD FOR MANUFACTURING THE SAME

(75) Inventors: Youngcheol Jang, Suwon-si (KR); Heongsin Kim, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 574 days.

(21) Appl. No.: 12/820,254

(22) Filed: Jun. 22, 2010

(65) Prior Publication Data

US 2011/0052941 A1 Mar. 3, 2011

(30) Foreign Application Priority Data

Sep. 1, 2009 (KR) .................. 10-2009-0082160

(51) Int. Cl.
*H01M 14/00* (2006.01)
*H01M 4/82* (2006.01)

(52) U.S. Cl.
USPC .................. 429/7; 429/121; 429/176; 429/62

(58) Field of Classification Search
USPC ....................... 429/7, 121, 176, 62
See application file for complete search history.

(56) References Cited

U.S. PATENT DOCUMENTS

| | | | | |
|---|---|---|---|---|
| 6,432,575 B1 * | 8/2002 | Yamagami | ................ | 429/100 |
| 6,858,228 B2 * | 2/2005 | Katakuse et al. | .............. | 424/465 |
| 7,811,686 B2 * | 10/2010 | Seo et al. | ................ | 429/7 |
| 8,354,179 B2 * | 1/2013 | Kwag et al. | ................ | 429/7 |
| 8,361,645 B2 * | 1/2013 | Kim | ................ | 429/158 |
| 8,486,559 B2 * | 7/2013 | Koh et al. | ................ | 429/178 |
| 8,530,076 B2 * | 9/2013 | Kim | ................ | 429/170 |
| 8,546,003 B2 * | 10/2013 | Kim | ................ | 429/7 |
| 8,574,751 B2 * | 11/2013 | Jang et al. | ................ | 429/170 |
| 2003/0121142 A1 | 7/2003 | Kikuchi et al. | | |
| 2006/0068277 A1 * | 3/2006 | Kim et al. | ................ | 429/161 |
| 2006/0177733 A1 * | 8/2006 | Ha et al. | ................ | 429/159 |
| 2006/0251930 A1 | 11/2006 | Kim | | |
| 2007/0262745 A1 * | 11/2007 | Lee et al. | ................ | 320/112 |
| 2008/0171235 A1 * | 7/2008 | Seo et al. | ................ | 429/7 |
| 2008/0176131 A1 | 7/2008 | Byun et al. | | |
| 2009/0087693 A1 * | 4/2009 | Kim et al. | ................ | 429/8 |

FOREIGN PATENT DOCUMENTS

| | | |
|---|---|---|
| KR | 1020020064366 A | 8/2002 |
| KR | 1020040081105 A | 9/2004 |
| KR | 1020060115207 A | 11/2006 |
| KR | 1020070101568 A | 10/2007 |
| KR | 1020080016050 A | 2/2008 |
| KR | 1020080068266 A | 7/2008 |
| KR | 100651057 B1 | 11/2008 |

OTHER PUBLICATIONS

Korean Notice of Allowance issued by KIPO dated Oct. 21, 2011, 5 pages.
KIPO Office Action dated Jan. 20, 2011, 4 pages.

* cited by examiner

*Primary Examiner* — Joseph S Del Sole
*Assistant Examiner* — Nahida Sultana
(74) *Attorney, Agent, or Firm* — Knobbe, Martens, Olson & Bear, LLP

(57) ABSTRACT

A secondary battery secondary battery includes a bare cell having an electrode terminal, and a protective circuit module having a circuit board and a lead plate. The protective circuit module is electrically connected to the bare cell such that the electrode terminal and the circuit board are connected to each other through the lead plate. The lead plate includes a first plate mounted on the circuit board, and a second plate foldably connected to the first plate.

16 Claims, 4 Drawing Sheets

SECONDARY BATTERY AND METHOD FOR MANUFACTURING THE SAME

CROSS-REFERENCE TO RELATED APPLICATION

This application claims the benefit of Korean Patent Application No. 10-2009-0082160, filed Sep. 1, 2009 in the Korean Intellectual Property Office, the disclosure of which is incorporated herein by reference.

BACKGROUND

1. Field of the Invention

Aspects of the present invention relate to a secondary battery, and a method for manufacturing the same.

2. Description of the Related Art

In general, unlike primary batteries which are not rechargeable, secondary batteries are charged and discharged. Small-sized secondary batteries are widely employed in high-technology electronic devices such as cellular phones, laptop computers, and camcorders while large-capacity secondary batteries are typically used for driving motors of electric automobiles or hybrid automobiles. Among various kinds of secondary batteries, lithium secondary batteries are being widely used because they have a relatively high operational voltage and a relatively greater energy density per unit weight. Lithium secondary batteries are being produced in a variety of shapes and are exemplified by cylinder type batteries, can type batteries, pouch type batteries, and so forth.

A lithium secondary battery is generally configured to include an electrode assembly having a positive electrode plate, a negative electrode plate and a separator, and an electrolyte interacting with the electrode assembly using a chemical reaction. The electrode assembly and the electrolyte are housed in a bare cell.

SUMMARY

Aspects of the present invention provide a secondary battery having a new connection structure between an electrode terminal and a lead plate, and a method for manufacturing the secondary battery.

Other aspects of the present invention provide a secondary battery having a mechanically reinforced structure between an electrode terminal and a lead plate, and a method for manufacturing the secondary battery.

In accordance with one aspect of the present invention, there is provided a secondary battery including a bare cell having an electrode terminal, and a protective circuit module having a circuit board and a lead plate and electrically connected to the bare cell such that the electrode terminal and the circuit board are connected to each other through the lead plate, wherein the lead plate includes a first plate mounted on the circuit board, and a second plate foldably connected to the first plate.

According to an aspect of the invention, the first plate may be mounted on the circuit board such that a main surface a main surface of the first plate comes into contact with a main surface of the circuit board, and the second plate may extend from one edge of the first plate.

According to an aspect of the invention, the first plate may be soldered on the circuit board.

According to an aspect of the invention, the removal parts each having a smaller width than surrounding parts may be formed at a portion where the first and second plates are foldably connected to each other.

According to an aspect of the invention, the first and second plates and the electrode terminal may be connected to each other by resistance welding.

According to an aspect of the invention, the electrode terminal may be disposed between the first and second plates.

According to an aspect of the invention, the resistance welding may be performed at multiple locations on an outer surface of the second plate.

According to an aspect of the invention, the lead plate may further include a third plate foldably extending from the second plate.

According to an aspect of the invention, the electrode terminal may be disposed between the second and third plates.

According to an aspect of the invention, the second and third plates and the electrode terminal may be connected by resistance welding.

According to an aspect of the invention, the resistance welding may be direct welding that is performed on exterior surfaces of the second and third plates, which are opposite to their interior surfaces facing the electrode terminal.

According to an aspect of the invention, the electrode terminal may be made of aluminum and the lead plate is made of nickel.

According to an aspect of the invention, the lead plate is seated on a region occupied by a main surface of the circuit board.

In accordance with another aspect of the present invention, there is provided a secondary battery including a bare cell, a protective circuit module and a pair of cover regions. The bare cell may incorporate an electrode assembly therein. An electrode terminal may be connected to the electrode assembly and have one end exposed to the outside. The protective circuit module may include a circuit board and a lead plate having a first region and a second region, and electrically connected to the bare cell such that the first region of the lead plate is connected to the circuit board and the second region of the lead plate is connected to the electrode terminal. The pair of cover regions may be formed on the second region of the lead plate and folded with respect to each other to then be connected to the electrode terminal while covering both surfaces of the electrode terminal.

According to an aspect of the invention, the pair of cover regions and the electrode terminal may be connected to each other by welding, which is performed on outer surfaces of the pair of cover regions.

According to an aspect of the invention, the welding may be performed by direct spot welding.

According to an aspect of the invention, the electrode terminal may be made of aluminum and the lead plate may be made of nickel.

In accordance with still another aspect of the present invention, there is provided a method for manufacturing a secondary battery, the method including forming a pair of cover regions on a lead plate of a protective circuit module so as to overlap with respect to each other, disposing an electrode terminal extending from a bare cell between the pair of cover regions, welding the pair of cover regions and the electrode terminal to be integrally coupled to each other, and securing the protective circuit module to a location outside the bare cell.

When in the pair of cover regions, only one of its outer surfaces is accessible, the welding may be performed by series spot welding according to an aspect of the invention.

When in the pair of cover regions, both of its outer surfaces are accessible, the welding is performed by direct spot welding according to an aspect of the invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
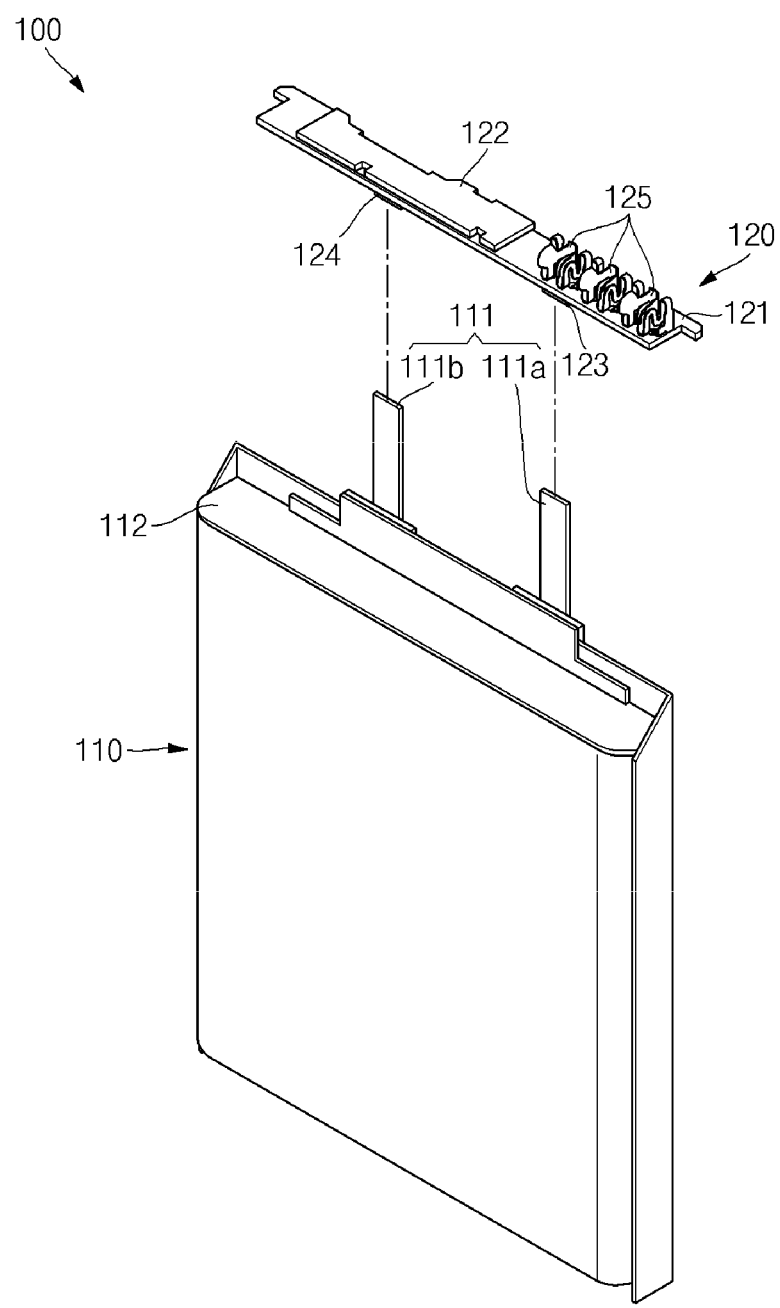
FIG. 1 is an exploded perspective view of a secondary battery having a protective circuit module according to an exemplary embodiment of the present invention.

Reference will now be made in detail to the present embodiments of the present invention, examples of which are illustrated in the accompanying drawings, like reference numerals refer to the like elements throughout. The embodiments are described below in order to explain the present invention by referring to the figures.

FIG. 1 is an exploded perspective view of a secondary battery 100 having a protective circuit module according to an exemplary embodiment of the present invention. Referring to FIG. 1, a configuration of the secondary battery 100 may be largely defined by a bare cell 110 and a protective circuit module 120. The bare cell 110 may include an electrode assembly (not shown) and an electrode terminal 111. In the illustrated embodiment, the electrode assembly and part of the electrode terminal 111 are housed in a pouch type case. However, the invention is not limited thereto.

The electrode assembly includes a positive electrode plate and a negative electrode plate. The positive electrode plate has a positive electrode coating portion coated on a surface of a positive electrode collector. The negative electrode plate has a negative electrode coating portion coated on a surface of a negative electrode collector. A separator is disposed between the positive electrode and the negative electrode plate and insulates the positive electrode plate and the negative electrode plate from each other. In the electrode assembly, the positive electrode plate, the separator and the negative electrode plate are sequentially stacked. In addition, the separator is wound in a jelly-roll configuration to be housed in the case. An electrolyte is included in the electrode assembly and can be a liquid, gel, and/or solid electrolyte. However, it is understood that other types of electrode assemblies can be used.

The positive electrode collector is made of a conductive metal. During charging, the positive electrode collector collects electrons from the positive electrode coating portion and moves the collected electrons to an external circuit (not shown). The positive electrode coating portion is prepared by mixing a positive electrode active material, a conductive member and a binder, and coating the resultant mixture on the positive electrode collector to a predetermined thickness.

The negative electrode plate is made of a conductive metal, which may be the same or different from the conductive metal of the positive electrode collector. During discharging, the negative electrode collector collects electrons from the negative electrode coating portion and moves the collected electrons to an external circuit (not shown). The negative electrode coating portion is prepared by mixing a negative electrode active material, a conductive member and a binder, and coating the resultant mixture on the negative electrode collector to a predetermined thickness.

The shown electrode terminal 111 includes a first electrode terminal 111a and a second electrode terminal 111b. One end of the electrode terminal 111 is connected to the electrode assembly. The first electrode terminal 111a is electrically connected to the positive electrode plate or the negative electrode plate to serve as an electrically positive electrode or a negative electrode. In the course of assembling the secondary battery 100, the first electrode terminal 111a is electrically connected to the protective circuit module 120, and may be bent on one surface of the bare cell 110.

The second electrode terminal 111b is electrically connected to the positive electrode plate or the negative electrode plate to serve as an electrode having the opposite polarity to that of the first electrode terminal 111a. In the course of assembling the secondary battery 100, the second electrode terminal 111b is electrically connected to the protective circuit module 120, and may be bent on one surface of the bare cell 110.

The other end of the electrode terminal 111 is exposed at one end of the bare cell 110. An insulation tape 112 is provided between the one surface of the bare cell 110 and each of the first electrode terminal 111a and the second electrode terminal 111b. The insulation tape 112, can be, for example, an adhesive tape adhering the first electrode terminal 111a and the second electrode terminal 111b, which are bent along the one surface of the bare cell 110, to each other.

The shown protective circuit module 120 includes a circuit board 121, a protective circuit unit 122, first and second lead plates 123 and 124, and an external terminal 125. The protective circuit module 120 may include circuits and/or devices for protecting the bare cell 110 from over-charging and over-discharging.

The protective circuit unit 122 includes a switching circuit, and protects the secondary battery 100 by allowing charge/discharge circuits to be opened in an event of over-charging or over-discharging, thereby protecting the secondary battery 100. The first and second lead plates 123 and 124 are provided on a surface opposite to a surface on which the protective circuit unit 122 of the circuit board 121 is mounted. The first and second lead plates 123 and 124 are connected to the first and second terminals 111a and 111b of the electrode terminal 111, respectively. That is, the protective circuit module 120 can control charging/discharging of the bare cell 110 by connecting the lead plates 123 and 124 to the electrode terminal 111. The connection mechanism of the lead plates 123 and 124 and the electrode terminal 111 will later be described with reference to FIGS. 2 through 6. While the first and second lead plates 123 and 124 are shown provided on the surface opposite to the surface on which the protective circuit unit 122 of the circuit board 121 is mounted, the invention is not limited thereto and the first and second lead plates 123 and 124 can be provided on the surface on which the protective circuit unit 122 of the circuit board 121 is mounted.

Referring back to FIG. 1, the external terminal 125 is electrically connected to a terminal of an external device (not shown) during charging or discharging of the secondary battery 100.

The protective circuit module 120 is connected to the electrode terminal 111 of the bare cell 110 and is seated on one side of the bare cell 110 through the lead plates 123 and 124. In detail, the protective circuit module 120 is provided on the insulation tape 112. Here, the electrode terminal 111 may have one end bent so as to be positioned on the insulation tape 112.

In order to integrally form the protective circuit module 120 with the bare cell 110 in a state in which the protective circuit module 120 is enclosed, an upper case (not shown) may be formed at one side of the bare cell 110. The upper case can be formed using injection molding. Meanwhile, a lower case (not shown) may be formed at the other side of the bare cell 110, that is, opposite to the one side where the upper case is formed. A label (not shown) made of, for example, a metal plate, may be attached to the bare cell 110 to wrap main surfaces of the bare cell 110.

While the bare cell 110 has been described with regard to a pouch type secondary battery by way of example, the invention is not limited thereto. That is to say, the bare cell 110 according to the present invention may also include a bare cell of a prismatic secondary battery.

Figure 2:
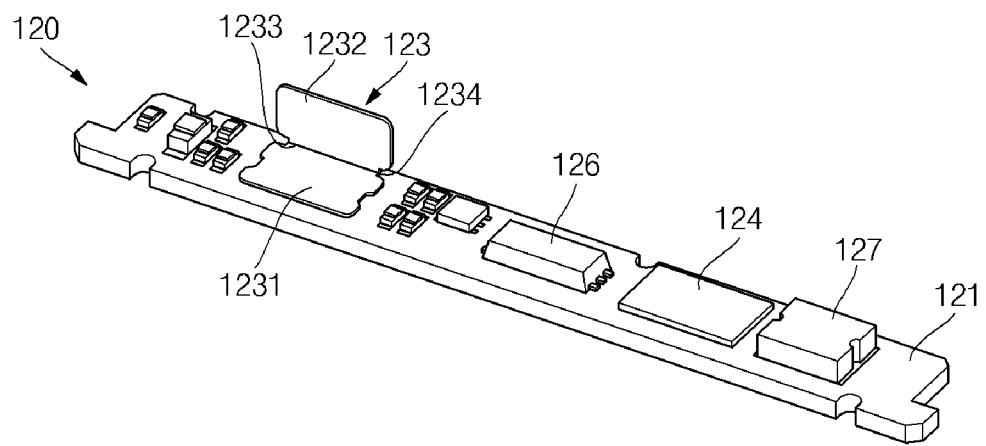
FIG. 2 is a perspective view illustrating a reverse side of a protective circuit module shown in FIG. 1.

FIG. 2 is a perspective view illustrating a reverse side of a protective circuit module 120 shown in FIG. 1. Referring to FIGS. 1 and 2, the first lead plate 123 and the second lead plate 124 are disposed on a first surface of the circuit board 121 and are spaced apart from each other. In detail, the first and second lead plates 123 and 124 are spaced apart from each other to correspond to the first and second electrode terminals 111a and 111b, respectively. The first and second lead plates 123 and 124 may be made of nickel, but the invention is not limited thereto.

The first lead plate 123 is connected to the first electrode terminal 111a. If the first lead plate 123 is made of nickel, the first electrode terminal 111a may be made of aluminum, but the invention is not limited thereto.

The first lead plate 123 includes a first plate 1231 and a second plate 1232. The first plate 1231 is mounted on the circuit board 121. The second plate 1232 extends from one edge of the first plate 1231. In detail, the second plate 1232 is folded toward and across the first plate 1231 in view of a folding line 1233 corresponding to the one edge of the first plate 1231. While shown as extending from the first plate 1231, it is understood that the second plate 1232 could be pivotably mounted on the first plate 1231.

Cut portions 1234, each having a smaller width than surrounding parts, are formed at opposite ends of the folding line 1233. When soldering is performed to mount the first plate 1231 of the first lead plate 123 on the circuit board 121, a soldering material is adhered to lateral surfaces of the cut parts 1234. The cut portions 1234 increase an adhered area of the soldering material. This allows the first lead plate 123 to be connected to the circuit board 121 in a more secured manner. The cut portions 1234 are centrally formed at both edges of the first plate 1231 and may be used as a space for receiving hooks for adjacent structures when the second plate 1232 is folded. However, it is understood that the cut portions 1234 need not be used in all aspects of the invention.

While not required in all aspects, secondary protective devices 126 and 127 are shown mounted on the circuit board 121 in areas where the first and second lead plates 123 and 124 are not provided. For example, the secondary protective device 126 may be a switching device, such as a field effect transistor (FET) or an integrated circuit (IC). The secondary protective device 127 may be a positive temperature coefficient (PTC) device. The secondary protective devices 126 and 127 may control the electrode assembly of the bare cell 110 or interrupt charge/discharge circuits in cooperation with the protective circuit unit 122 when the electrode assembly abnormally operates.

In the illustrated embodiment, the second lead plate 124 is a single member which is then be mounted on the circuit board 121, unlike the first lead plate 123. This is because the second lead plate 124 and the second electrode terminal 111b are made of the same material, (e.g., nickel) which makes connecting them 124 and 111b by, (e.g., welding) relatively easy. However, in a case where a material used for the second electrode terminal 111b is changed, the second lead plate 124 may also be foldably formed, like the first lead plate 123.

Figure 3:
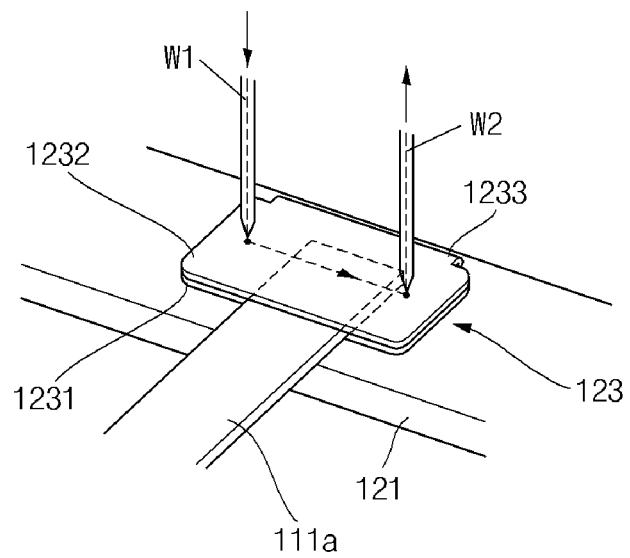
FIG. 3 is a partial perspective view illustrating a connection mechanism in which a first lead plate and a first electrode terminal shown in FIG. 1 are connected to each other.

FIG. 3 is a partial perspective view illustrating a connection mechanism in which the first lead plate 123 and the first electrode terminal 111a are connected to each other. Referring to FIG. 3, a free end of the first electrode terminal 111a is inserted above the first plate 1231. The second plate 1232 is folded to be close to the first plate 1231 along the folding line 1233. Thus, the first electrode terminal 111a is between the first and second plates 1231, 1232.

A connection between the first lead plate 123 and the first electrode terminal 111a may be established by welding, specifically resistance welding. Particularly, resistance spot welding may be used in welding the first lead plate 123 and the first electrode terminal 111a, which are made of a metallic material. In resistance spot welding, electrodes W1 and W2 are arranged in parallel on an outer surface of the second plate 1232. If a pressure is applied to the electrodes W1 and W2 and a current for welding is applied to the second plate 1232 within a short time, Joule heat is generated. Then, the generated Joule heat allows the first and second plates 1231 and 1232 and the first electrode terminal 111a to be molten and welded. Spot welding in such an arrangement, in which the electrodes W1 and W2 are arranged in parallel, is referred to as series welding in the specification of this application.

According to this embodiment, as the first and second plates 1231 and 1232 are made of the same material (having the same melting point, accordingly), the plates 1231,1232 are adhered to each other using series welding. Thus, the plates 1231, 1232 can be more securely connected to the first electrode terminal 111a, which is made of a different material from the material of the plates 1231, 1232.

While the connection mechanism has been described with regard to spot welding, the invention is not limited thereto. For instance, slit welding or projection welding may also be used according to a variation in the thickness of the first lead plate 123.

Figure 4:
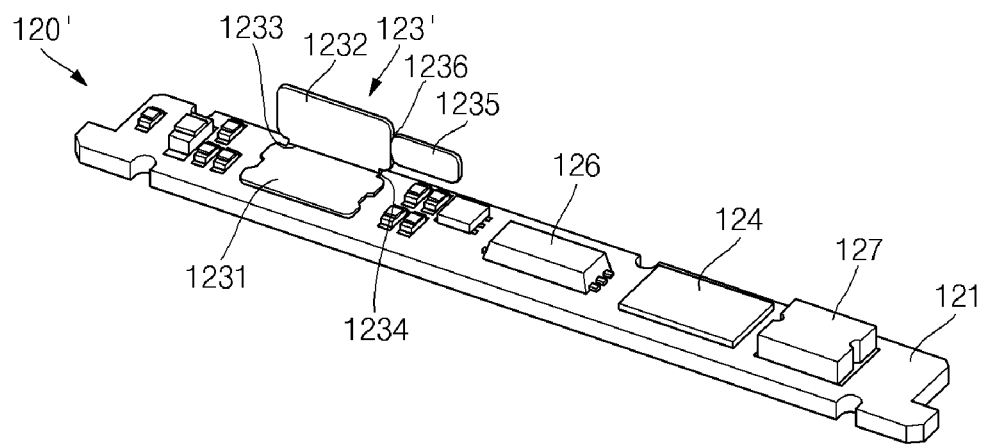
FIG. 4 is a perspective view of a protective circuit module according to another exemplary embodiment of the present invention.

FIG. 4 is a perspective view of a protective circuit module 120' according to another exemplary embodiment of the present invention. Referring to FIG. 4, the protective circuit module 120' is substantially the same as the protective circuit module 120 shown in FIG. 2, except that a first lead plate 123' further includes a third plate 1235.

The first lead plate 123' includes first through third plates 1231, 1232 and 1235. The second plate 1232 is folded with respect to the first plate 1231 in view of the folding line 1233. The third plate 1235 is folded with respect to the second plate 1232 in view of the folding line 1236. Although FIG. 4 illustrates that a folding line 1236 is substantially perpendicular to the folding line 1233, the present invention is not limited thereto and the folding lines 1233 and 1236 may also be substantially parallel to each other.

Figure 5:
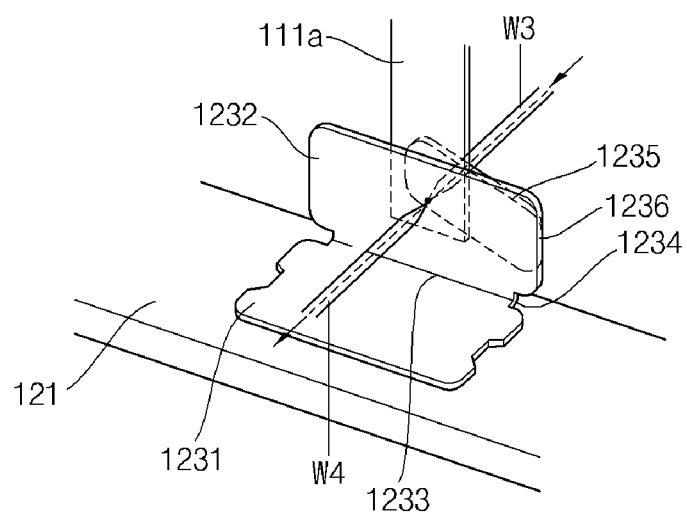
FIG. 5 is a partial perspective view illustrating a welding mode of a first lead plate and a first electrode terminal shown in FIG. 4.

FIG. 5 is a partial perspective view illustrating a welding mode of the first lead plate 123' and the first electrode terminal 111a shown in FIG. 4. Referring to FIG. 5, the first electrode terminal 111a is disposed between the second plate 1232 and the third plate 1235. The third plate 1235 pivotally moves about the folding line 1236 toward the second plate 1232, covering an exposed surface of the first electrode terminal 111a.

In order to perform resistance welding for connecting the first electrode terminal 111a and the first lead plate 123', electrodes W3 and W4 are arranged on exposed surfaces of the second plate 1232 and the third plate 1235, respectively. With this arrangement, a direct current flows through a line and a Joule heat is generated. The first lead plate 123' and the first electrode terminal 111a are connected to each other by the Joule heat, which is referred to as direct welding. Then, the assembly resulting from the welding (i.e., the welded second plate 1232, the first electrode terminal 111a, and the third plate 1235) is folded about the folding line 1233 to cover the first plate 1231. Accordingly, the first through third plates 1231, 1232 and 1235 are positioned in a region occupied by the main surface of the circuit board 121, like in the previous embodiment.

Figure 6:
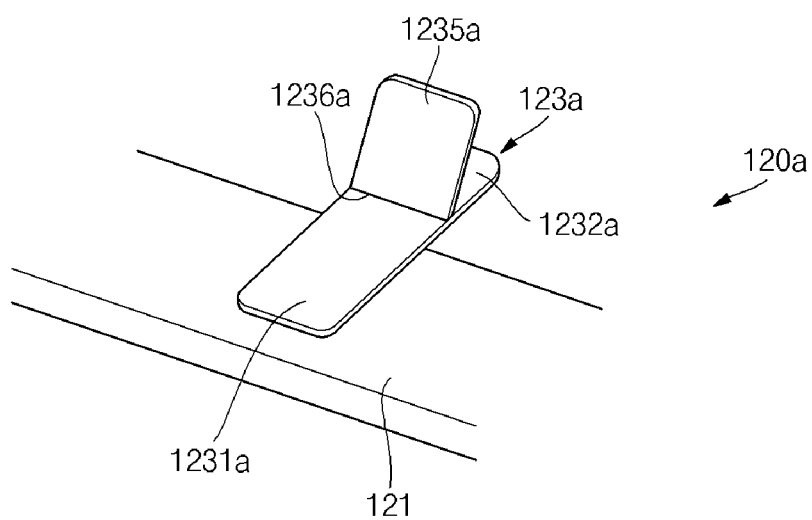
FIG. 6 is a perspective view of a protective circuit module according to still another exemplary embodiment of the present invention.

FIG. 6 is a perspective view of a protective circuit module 120a according to still another exemplary embodiment of the present invention. Referring to FIG. 6, in the protective circuit module 120a, a first region 1231a of the first lead plate 123a is seated on the circuit board 121. A second region 1232a of the first lead plate 123a extends off of the circuit board 121. The first region 1231a and the second region 1232a of the first lead plate 123a are associated with both ends of the first lead plate 123a, respectively.

A third region 1235a is formed in the first lead plate 123a to be foldable with respect to the second region 1232a of the first lead plate 123a about the folding line 1236a. The second and third regions 1232a and 1235a, which cover the first electrode terminal (not shown) inserted therebetween, may be referred to as cover regions.

The first electrode terminal is disposed between the cover regions 1232a and 1235a and may be subjected to direct welding, as described above. By doing so, even if the first electrode terminal and the first lead plate 123a are made of different materials, the first electrode terminal 111a and the first lead plate 123a can be connected to each other in a more secured manner. Following the welding, the first lead plate 123a may further be folded, like in the previous embodiment, if necessary. Alternatively, as shown in FIG. 6, the first lead plate 123a may deviate from the circuit board 121 to then be retained in an extended state.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
a bare cell having an electrode assembly connected to an electrode terminal; and
a protective circuit module having a circuit board and a lead plate, the lead plate electrically connecting the electrode terminal of the bare cell to the circuit board,
wherein the lead plate includes a first plate mounted on the circuit board, and a substantially flat second plate connected to and folded across the first plate along a folding line;
wherein the electrode terminal is disposed between the first and second plates and substantially perpendicular to the folding line.

2. The secondary battery of claim 1, wherein the first plate is mounted on the circuit board such that a main surface of the first plate comes into contact with a main surface of the circuit board, and the second plate extends from one edge of the main surface of the first plate.

3. The secondary battery of claim 2, wherein the first plate is soldered on the circuit board.

4. The secondary battery of claim 3, wherein:
a cut portion is formed at an edge of a fold portion where the first and second plates are foldably connected to each other, and
each cut portion extends into the fold portion forming surrounding parts and has a smaller width than widths of the surrounding parts.

5. The secondary battery of claim 1, wherein the first and second plates and the electrode terminal are connected to each other by resistance welding.

6. The secondary battery of claim 1, wherein the resistance welding is performed at multiple locations on an outer surface of the second plate.

7. The secondary battery of claim 1, wherein the lead plate further includes a third plate extending from and folded across the second plate.

8. The secondary battery of claim 7, wherein the electrode terminal is disposed between the second and third plates.

9. The secondary battery of claim 8, wherein the second and third plates and the electrode terminal are connected by resistance welding.

10. The secondary battery of claim 9, wherein the resistance welding is direct welding that is performed on exterior surfaces of the second and third plates, which are opposite to their interior surfaces facing the electrode terminal.

11. The secondary battery of claim 1, wherein the electrode terminal comprises aluminum and the lead plate comprises nickel.

12. The secondary battery of claim 1, wherein the lead plate is seated on a region occupied by a main surface of the circuit board.

13. A secondary battery comprising:
a bare cell incorporating an electrode assembly, the bare cell including an electrode terminal extending from the electrode assembly to one end exposed to the outside of the bare cell;
a protective circuit module including a circuit board and a lead plate having a first region and a second region, and the first region being connected to the circuit board and the second region being connected to the electrode terminal such that the circuit module is electrically connected to the bare cell; and
a pair of substantially flat conductive cover regions on the second region and folded across each other and being connected to opposing surfaces of the electrode terminal.

14. The secondary battery of claim 13, wherein the pair of cover regions and the electrode terminal are connected to each other by welding, which is performed on outer surfaces of the pair of cover regions.

15. The secondary battery of claim 14, wherein the welding is performed by direct spot welding.

16. The secondary battery of claim 14, wherein the electrode terminal comprises aluminum and the lead plate comprises nickel.

* * * * *